(12) United States Patent
Yang et al.

(10) Patent No.: US 11,416,110 B2
(45) Date of Patent: Aug. 16, 2022

(54) INTERACTIVE SYSTEM

(71) Applicant: Lixel Inc., Taipei (TW)

(72) Inventors: Chun-Hsiang Yang, Hsinchu (TW); Chih-Hung Ting, New Taipei (TW); Kai-Chieh Chang, Kaohsiung (TW); Der-Jang Yu, Hsinchu (TW); Wen-Chi Lin, Hsinchu County (TW)

(73) Assignee: LIXEL INC., Taipei (TW)

( * ) Notice: Subject to any disclaimer, the term of this patent is extended or adjusted under 35 U.S.C. 154(b) by 0 days.

(21) Appl. No.: 17/204,049

(22) Filed: Mar. 17, 2021

(65) Prior Publication Data

US 2022/0100349 A1 Mar. 31, 2022

(30) Foreign Application Priority Data

Sep. 30, 2020 (TW) .................................. 109134072

(51) Int. Cl.
*G06F 3/04815* (2022.01)
*G06F 3/01* (2006.01)
*G06F 3/0481* (2022.01)

(52) U.S. Cl.
CPC .......... *G06F 3/04815* (2013.01); *G06F 3/014* (2013.01); *G06F 3/016* (2013.01)

(58) Field of Classification Search
CPC ....... G06F 3/04815; G06F 3/014; G06F 3/016
See application file for complete search history.

(56) References Cited

U.S. PATENT DOCUMENTS

| | | | | |
|---|---|---|---|---|
| 2004/0021681 | A1* | 2/2004 | Liao | G06F 3/04886 715/702 |
| 2006/0013462 | A1* | 1/2006 | Sadikali | G16H 30/40 382/128 |
| 2006/0034043 | A1* | 2/2006 | Hisano | G06F 1/1679 361/679.04 |
| 2013/0057487 | A1* | 3/2013 | Yamanaka | G06F 1/169 345/173 |
| 2014/0075377 | A1* | 3/2014 | Kang | G06F 3/04842 715/788 |
| 2015/0212647 | A1* | 7/2015 | Kim | G06F 1/1643 345/173 |
| 2018/0048883 | A1* | 2/2018 | Yang | H04N 13/383 |
| 2019/0325847 | A1* | 10/2019 | Kong | G06F 3/0484 |
| 2020/0081555 | A1* | 3/2020 | Powderly | G06F 3/016 |
| 2020/0099923 | A1* | 3/2020 | Champion | G06F 3/04815 |
| 2020/0290513 | A1* | 9/2020 | Karafin | G06F 3/017 |
| 2021/0299879 | A1* | 9/2021 | Pinter | G06T 7/0004 |

FOREIGN PATENT DOCUMENTS

| | | |
|---|---|---|
| TW | 201617785 A | 5/2016 |
| TW | I700516 B | 8/2020 |

* cited by examiner

*Primary Examiner* — Nicholas Augustine
(74) *Attorney, Agent, or Firm* — Li & Cai Intellectual Property (USA) Office

(57) ABSTRACT

An interactive system is provided. The interactive system includes an electronic device, a first image display device and a second image display device. The electronic device transmits a first image information to the first image display device for display. The electronic device transmits a second image information to the second image display device for display. Through the second image display device, a three-dimensional second image information is displayed in a space on one side of the second image display device. The three-dimensional second image information at least interacts with an object.

11 Claims, 18 Drawing Sheets

INTERACTIVE SYSTEM

CROSS-REFERENCE TO RELATED PATENT APPLICATION

This application claims the benefit of priority to Taiwan Patent Application No. 109134072, filed on Sep. 30, 2020. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to an interactive system, and more particularly to an interactive system that directly interacts with a three-dimensional image information.

BACKGROUND OF THE DISCLOSURE

Currently, in the field of augmented reality or virtual reality, most require physical interaction with electronic devices using physical and cognitive senses of a user, rather than intuitive interaction with three-dimensional image information using objects or hands.

Accordingly, providing an interactive system that allows users to directly interact with three-dimensional image information has become one of the important issues to be solved in this business.

SUMMARY OF THE DISCLOSURE

In response to the above-referenced technical inadequacies, the present disclosure provides an interactive system including an electronic device, a first image display device and a second image display device. The electronic device includes a controller, a storage module and a connection module. The first image display device is electrically connected to the electronic device, and the first image display is a two-dimensional image display device for displaying a two-dimensional image information. The second image display device is connected to the electronic device, and the second image display device is a three-dimensional image display device. A program is provided in the electronic device, and the program at least provides a first image information and a second image information. The controller transmits the first image information to the first image display device for display, and the controller transmits the second image information to the second image display device for display, and through the second image display device, a three-dimensional image information of the second image information is displayed in a space on one side of the second image display device. The second image information displayed in the space on the one side of the second image display device is three-dimensional and at least interacts with an object.

In another aspect, the present disclosure provides an interactive system including an electronic device, a three-dimensional image display device and a sensor. The electronic device includes a controller, a storage module and a connection module, and the electronic device is connected to the three-dimensional image display device. The sensor is disposed on the electronic device or the image display device for detecting a plurality of object three-dimensional coordinate values of an object. A program is provided in the electronic device, the program is stored in the storage module or transmitted from the cloud, and the program at least provides an image information. The controller transmits the image information to the image display device for display, the controller transmits the image information to the three-dimensional image display device for display, and through the three-dimensional image display device, a three-dimensional image information is displayed in a space on one side of the image display device. The three-dimensional image information at least interacts with the object. The sensor transmits the plurality of object three-dimensional coordinate values to the controller, and the controller determines a plurality of second three-dimensional coordinate values of the three-dimensional image information according to the plurality of the object three-dimensional coordinate values and a plurality of first three-dimensional coordinate values of a three-dimensional image information of a second image information. The plurality of second three-dimensional coordinate values of the three-dimensional image information determines an action when the three-dimensional image information interacts with the object.

Therefore, the interactive system provided in the present disclosure allows the user to interact intuitively with the three-dimensional image information and generate corresponding movements and changes without the need to wear various types of augmented reality electronic devices.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the following detailed description and accompanying drawings, in which.

DETAILED DESCRIPTION OF THE EXEMPLARY EMBODIMENTS

Figure 1:
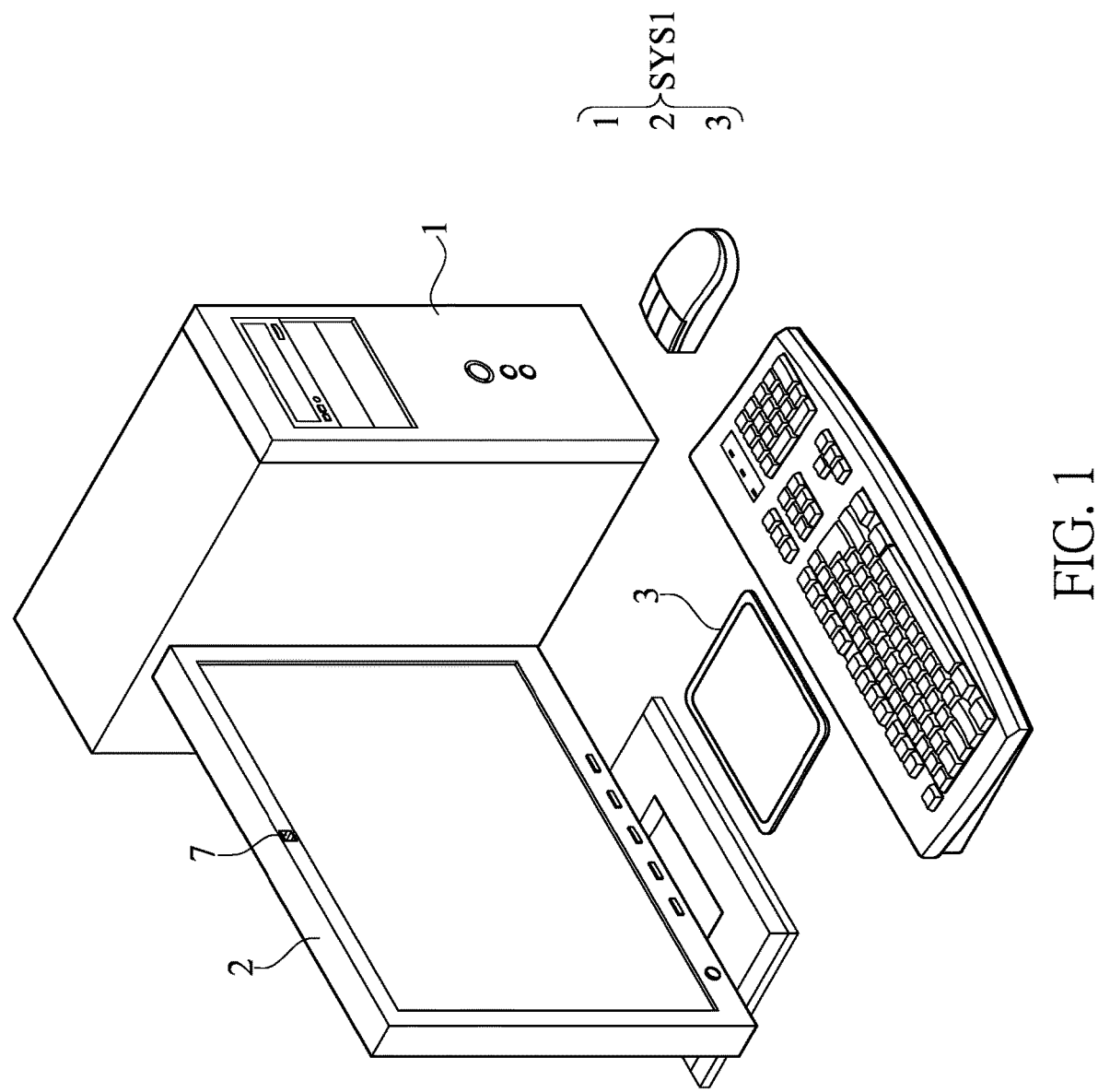
FIG. 1 is a schematic view of an interactive system according to a first embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

First Embodiment

Figure 2A:
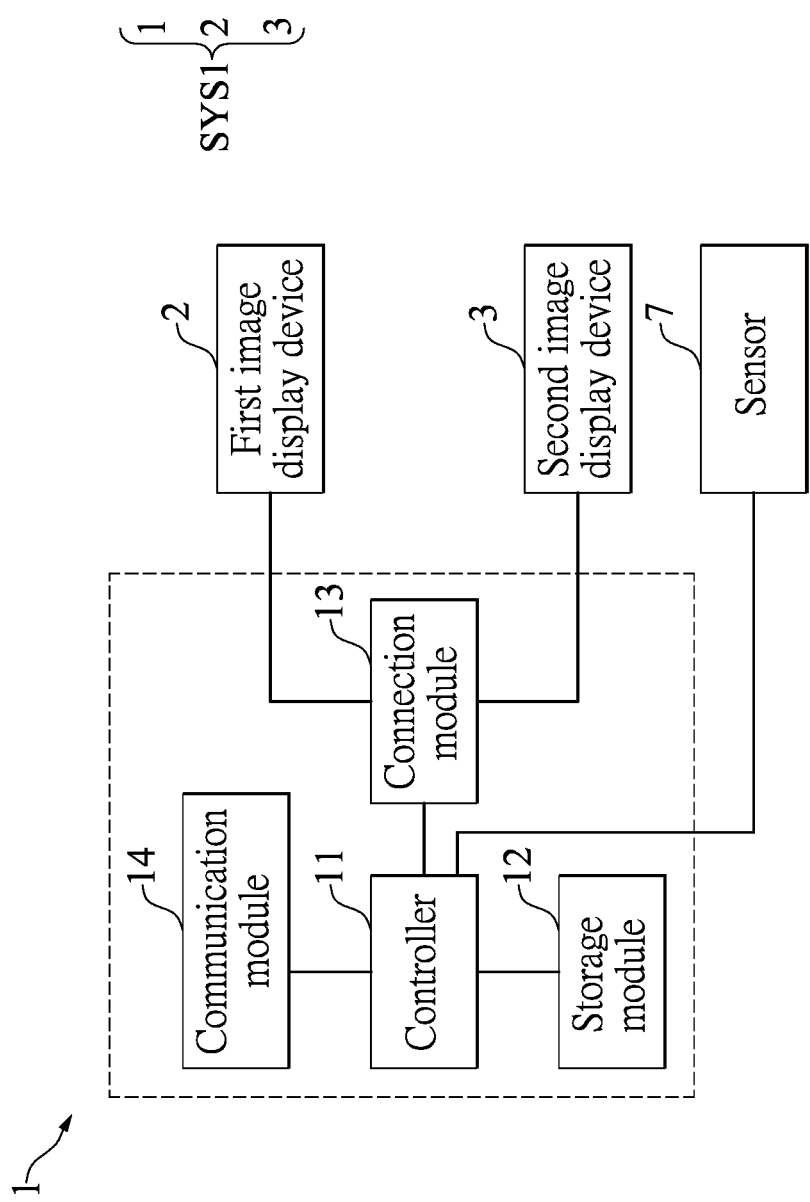
FIG. 2A is a functional block diagram of the interactive system according to the first embodiment of the present disclosure.
Figure 2B:
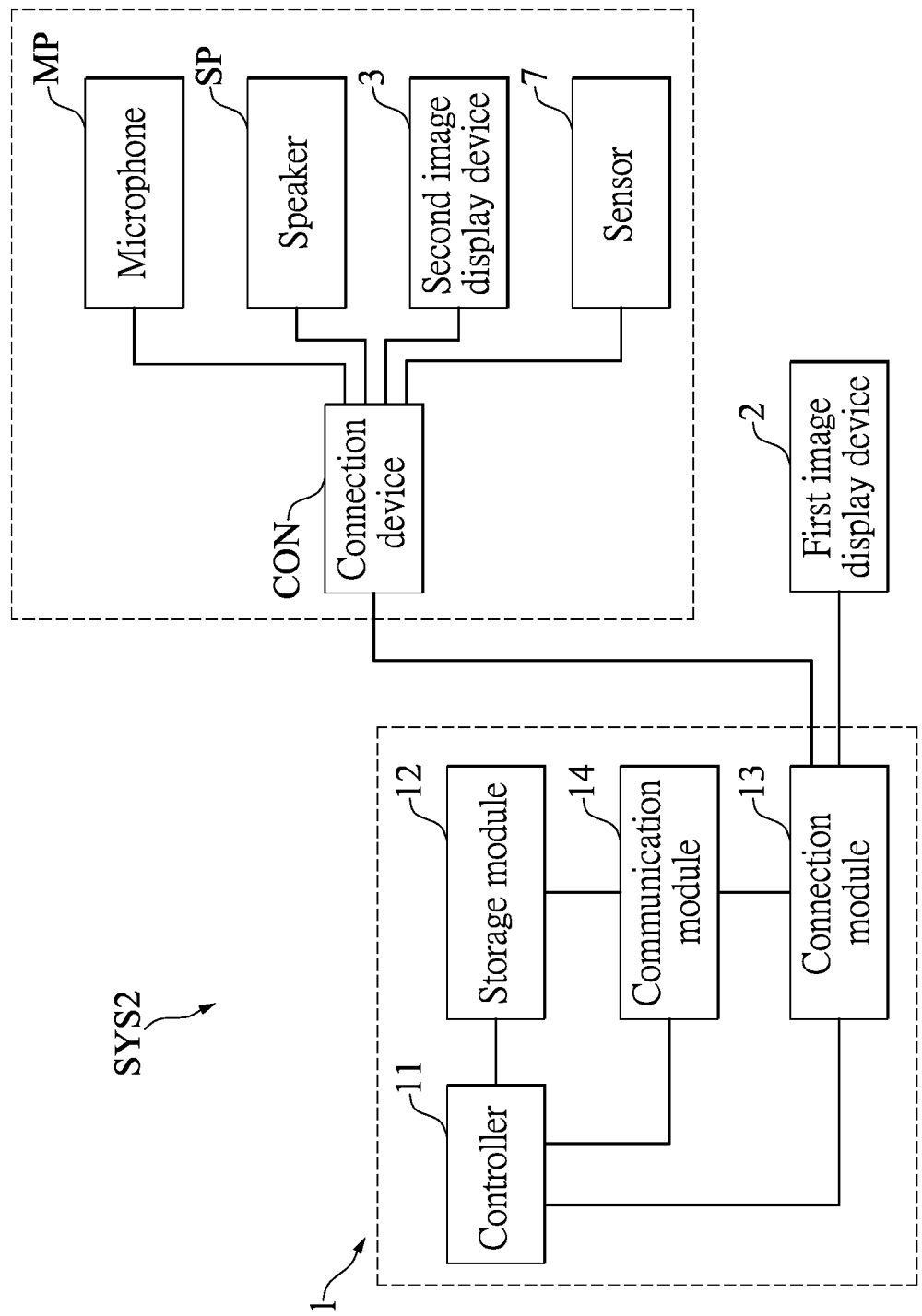
FIG. 2B is another functional block diagram of the interactive system according to the first embodiment of the present disclosure.
Figure 3:
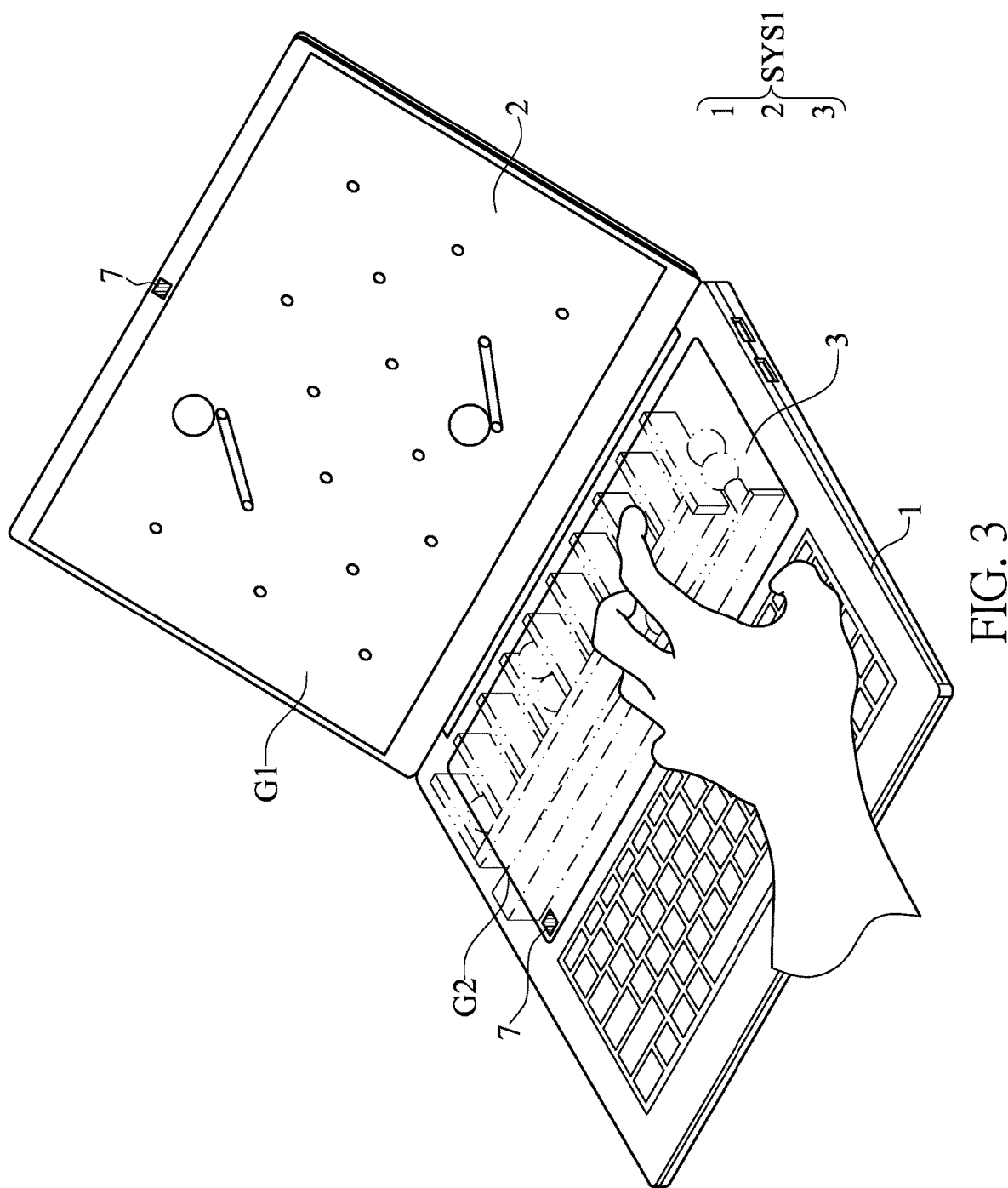
FIG. 3 is another schematic view of the interactive system according to the first embodiment of the present disclosure.

Referring to FIG. 1, FIG. 2A, FIG. 2B and FIG. 3, FIG. 1 is a schematic view of an interactive system according to a first embodiment of the present disclosure, FIG. 2A is a functional block diagram of the interactive system according to the first embodiment of the present disclosure, FIG. 2B is another functional block diagram of the interactive system according to the first embodiment of the present disclosure, and FIG. 3 is another schematic view of the interactive system according to the first embodiment of the present disclosure.

Referring to FIG. 1, an interactive system SYS1 includes an electronic device 1, a first image display device 2 and a second image display device 3. The electronic device 1 is a computer system that includes a controller 11, a storage module 12 and a connection module 13.

The first image display device 2 is electrically connected to the electronic device 1. The first image display device 2 is a two-dimensional image display device for displaying a two-dimensional image information. The second image display device 3 is connected to the electronic device 1. The second image display device 3 is a three-dimensional image display device. In the present embodiment, the second image display device 3 can be connected to the electronic device 1 through a wired communication or a wireless communication. The second image display device 3 can communicate with the electronic device 1 using a WI-FI® communication unit, a BLUETOOTH® communication unit, a Zigbee® communication unit, a LoRa communication unit, a Sigfox communication unit, or an NB-IoT communication unit.

The electronic device 1 further includes a communication module 14. The electronic device 1 can use the communication module 14 to connect the first image display device 2 and the second image display device 3. The communication module 14 can be a wired communication module or a wireless communication module. When the communication module 14 is a wireless communication module, the communication module 14 can be a WI-FI® communication module, a BLUETOOTH® communication module, a Zigbee® communication module, a LoRa communication module, a Sigfox communication module or an NB-IoT communication module.

The controller 11 is a central processing unit (CPU), an application specific integrated circuit (ASIC) or a microcontroller (MCU). The storage module 12 is a flash memory, a read-only memory, a programmable read-only memory, an electrically rewritable read-only memory, an erasable and programmable read-only memory or an electrically-erasable programmable read-only memory.

A program is provided in the electronic device 1, and the program at least provides a first image information G1 and a second image information G2. In addition, the program can be provided to the electronic device 1 from a cloud server. The controller 11 transmits the first image information G1 to the first image display device 2 for display. The controller 11 transmits the second image information G2 to the second image display device 3 for display. Through the second image display device 3, the second image information G2 that is three-dimensional is displayed in a space on one side of the second image display device 3. The second image information G2 that is three-dimensional at least interacts with an object, for example, a hand of a user, a finger of the user, a palm of the user, a tool, a toy, or an object, etc. In another embodiment, the first image display device 2 can also be used for displaying a three-dimensional image information.

In addition, the interactive system SYS1 further includes a sensor 7. In the present embodiment, the sensor 7 is disposed on the electronic device 1, the first image display device 2, or the second image display device 3 for detecting an object three-dimensional coordinate value of an object. In the present embodiment, the sensor 7 is an image capture unit, such as charge-coupled device. The sensor 7 may also include an eye tracking function to track a line-of-sight of humans or animals.

The sensor 7 transmits at least one object three-dimensional coordinate value to the controller 11. The controller 11 determines a plurality of second three-dimensional coordinate values of the second image information G2 that is three-dimensional according to the at least one object three-dimensional coordinate value and a plurality of first three-dimensional coordinate values of the second image information G2 that is three-dimensional. That is, the sensor 7 detects the object three-dimensional coordinate value of the object and compares the object three-dimensional coordinate value of the object with the plurality of first three-dimensional coordinate values of the second image information G2 that is three-dimensional to determine the plurality of second three-dimensional coordinate values of the second image information G2 that is three-dimensional. In this case, the plurality of first three-dimensional coordinate values of the second image information G2 that is three-dimensional are the same as or different from the plurality of second three-dimensional coordinate values of the second image information G2 that is three-dimensional.

When the plurality of first three-dimensional coordinate values of the second image information G2 that is three-dimensional are different from the plurality of second three-dimensional coordinate values of the second image information G2 that is three-dimensional, the second image information G2 that is three-dimensional generates a different action from the original second image information G2 that is three-dimensional.

As shown in FIG. 1, the first image display device 2 and the second image display device 3 are disposed separately from the electronic device 1. In FIG. 1, the electronic device 1 is a desktop computer. The first image display device 2 is a liquid crystal display, a micro LED display or an organic light emitting diode display (OLED display).

Referring to FIG. 2B, in another embodiment, an interactive system SYS2 also includes a microphone MP, a speaker SP and a connection device CON. The controller 11 of the electronic device 1 is electrically and correspondingly connected to the storage module 12, the connection module 13 and the communication module 14. The connection module 13 of the electronic device 1 is connected to the connection device CON. The connection device CON is correspondingly connected to the microphone MP, the speaker SP, the second image display device 3 and the sensor 7.

In the present embodiment, the connection device CON, the microphone MP, the speaker SP, the second image display device 3 and the sensor 7 can be disposed in the same device.

The microphone MP is used for receiving an audio information. When the microphone MP receives a control audio information, the microphone MP transmits the control audio information to the controller 11 through the connection device CON and the connection module 13 for analysis. The controller 11 further analyzes a control request signal in the control audio information, such as those for rotating, sitting down and jumping. Then, the controller 11 further controls an action of the second image information G2 that is three-dimensional displayed on the second image display device 3 according to the control request signal. In this way, the user can interact with the second image information G2 that is three-dimensional through sound. In addition, the controller 11 can transmit an interactive audio information corresponding to the second image information G2 that is three-dimensional to the speaker SP for playback, thereby enhancing the overall interactive experience of the user.

As shown in FIG. 3, the first image display device 2 is disposed on one side of the electronic device 1 and the second image display device 3 is disposed on the electronic device 1. In FIG. 3, the electronic device 1 is a laptop computer. That is, the electronic device 1 is a dual-screen laptop computer.

In the present embodiment, the first image information G1 and the second image information G2 of the interactive system SYS1 are two image information that can be stitched together, such as maps of different areas. However, the first image information G1 and the second image information G2 can also be two image information that are related in content. For example, in FIG. 3, the second image information G2 is a virtual keyboard, while the first image information G1 is an image of jumping musical notes. In addition, in the present embodiment, the second image information G2 can also be a pinball, while the first image information G1 is the bouncing path of a pinball machine.

Figure 4:
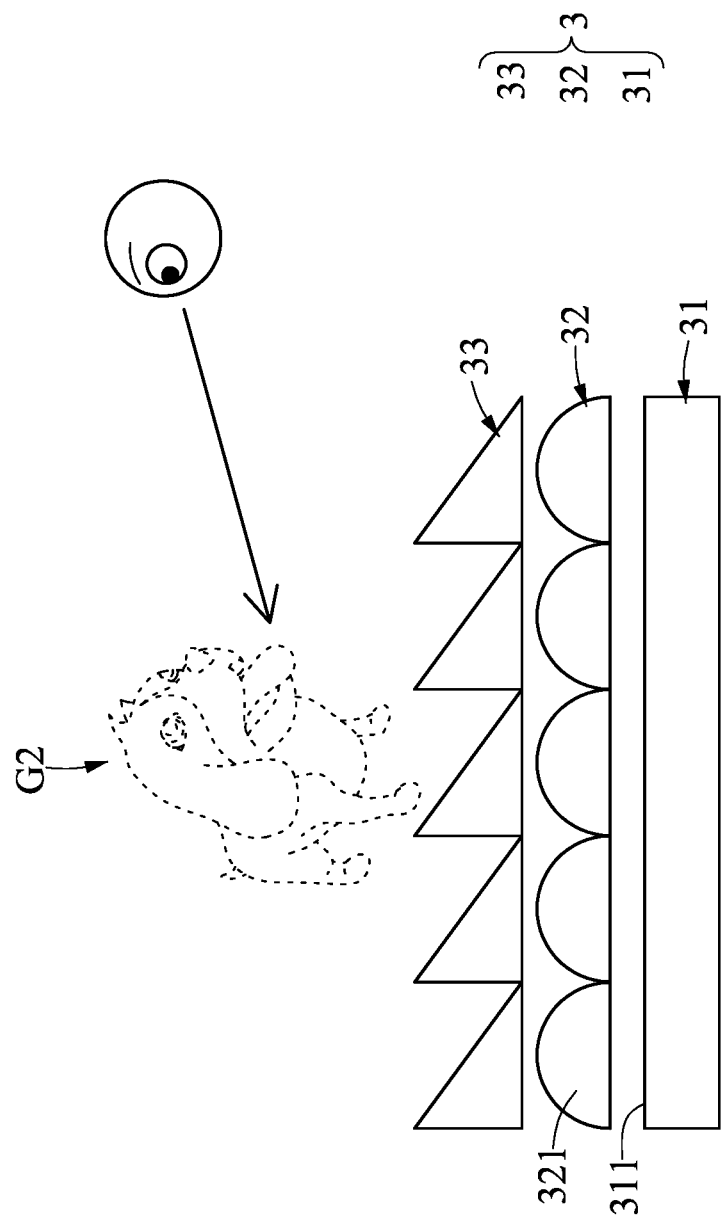
FIG. 4 is schematic structural view of a second image display device of the present disclosure.

Referring to FIG. 4, FIG. 4 is schematic structural view of a second image display device of the present disclosure.

The second image display device 3 includes a flat display module 31, a lens array layer 32 and a microstructure layer 33.

The flat display module 31 has a display surface 311. The flat display module 31 is used to provide the second image information G2 that is two-dimensional, and display the second image information G2 that is three-dimensional through the lens array layer 32 and the microstructure layer 33.

The lens array layer 32 is disposed on the display surface 311 of the flat display module 31 and receives the light of the second image information G2 that is two-dimensional for adjustment. The lens array layer 32 includes a plurality of lenses 321. The lens array layer 32 is used for modulating the light field.

The microstructure layer 33 is disposed on the lens array layer 32. The microstructure layer 33 includes a plurality of microstructures. The microstructure layer 33 is used for adjusting the angle and the direction of light. The microstructure layer 33 receives light through the lens array layer 32 and adjusts the light so that the second image display device 3 displays the three-dimensional image information floating in the space on the one side of the second image display device 3.

The lens 321 of the lens array layer 32 conforms to the oscilloscope formula of: $1/f=(n-1)(1/R1+1/R2)$, where R1 and R2 are correspondingly the radii of curvature on two side of the lens, f is the focal length of the lens and n is the refractive index of the lens.

In addition, the microstructure layer 33 is a dynamic optical component layer. That is, the microstructure layer 33 has a microstructure function mode and a non-microstructure function mode. The microstructure layer 33 can be adjusted to the microstructure function mode or the non-microstructure function mode according to a control signal. When the microstructure 33 is switched to the microstructure function mode, it can be used to adjust the angle and the direction of light. When the microstructure layer 33 is switched to the non-microstructure function mode, the second image display device 3 is used for displaying the two-dimensional image information, instead of displaying the three-dimensional image information floating in the space on the one side of the second image display device 3. The microstructure layer 33 is a liquid crystal lens array layer, which includes a plurality of microstructure liquid crystal lens. The lens array layer 32 is also a liquid crystal lens array layer, which includes a plurality of optically adjusted liquid crystal lens. That is, the second image display device 3 is a display device including at least two liquid crystal lens array layers. In another embodiment, the second image display device 3 can include more liquid crystal lens array layers for light adjustment. Further, in another embodiment, the second image display device 3 may have different quantities of the second image display device 3 provided in different areas for light adjustment. In addition, the lens array layer 32 includes a first structure lens array layer (not shown in figures) and a second structure lens array layer (not shown in figures). The first structure lens array layer (not shown) has a lens structure that can be used for modulating the light field, while the second structure lens array layer (not shown in figures) does not have a lens structure.

Figure 5:
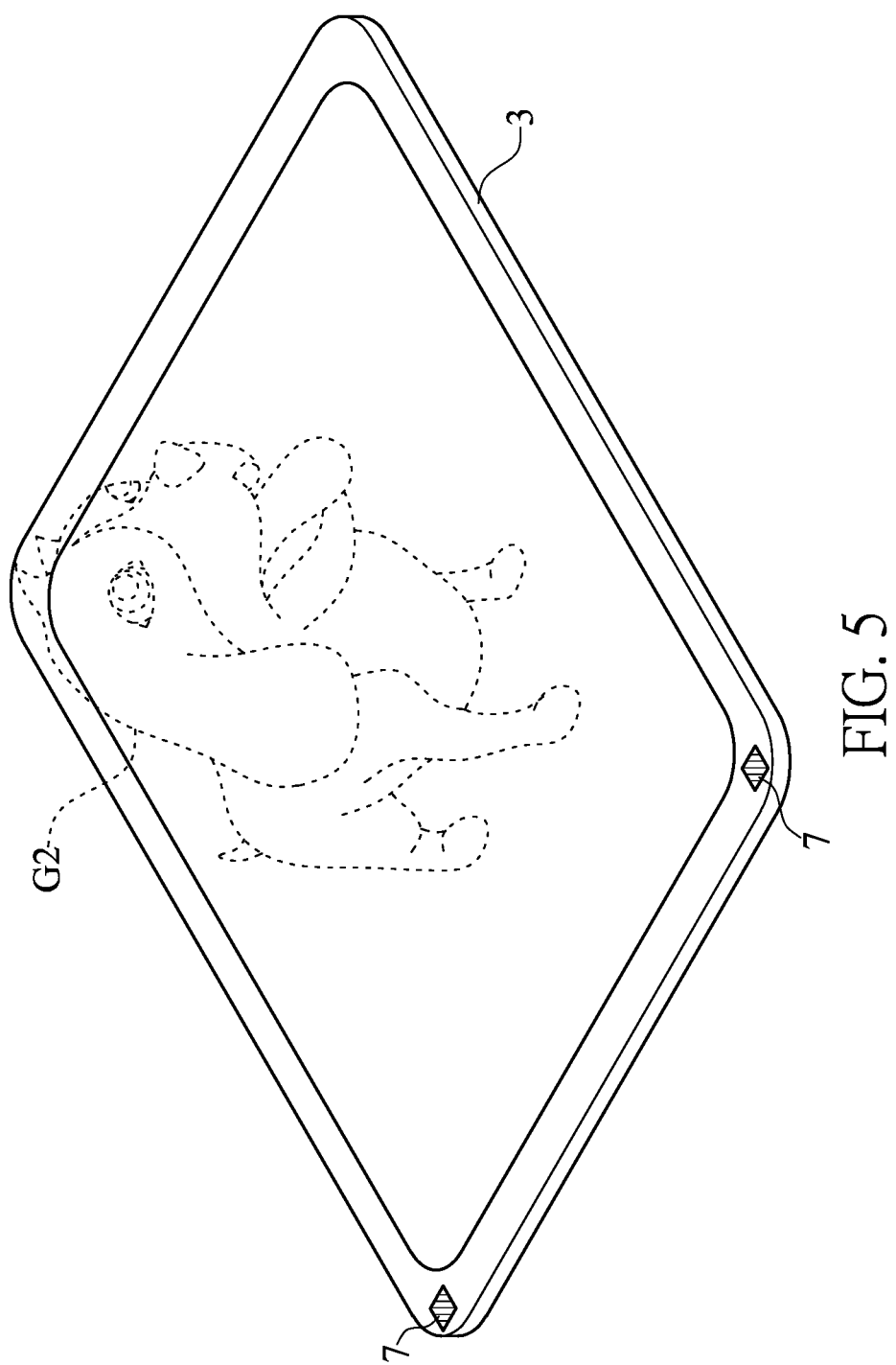
FIG. 5 is a schematic view of the second image display device displaying a second image information.
Figure 6:
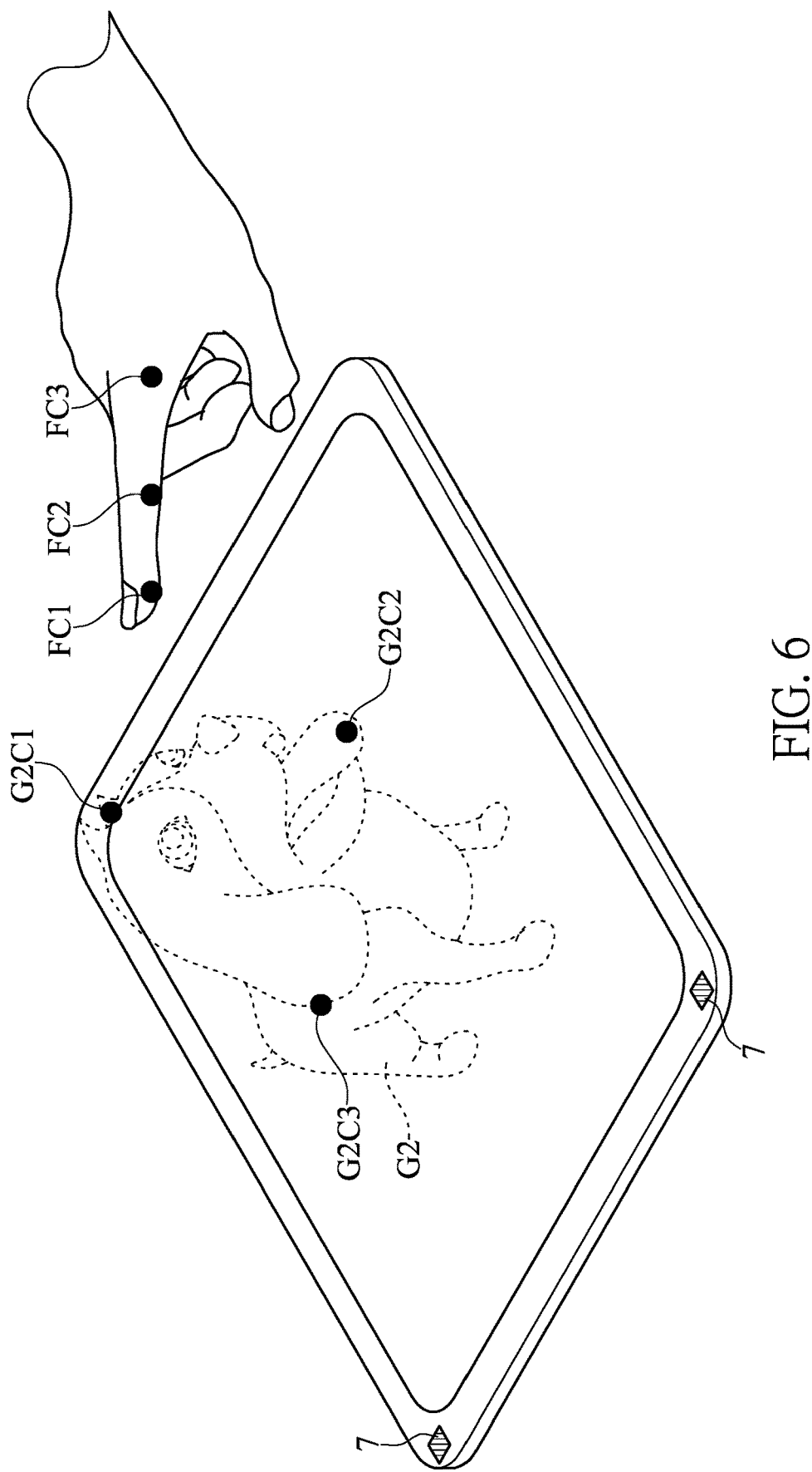
FIG. 6 is a schematic view of the second image information interacting with an object.
Figure 7:
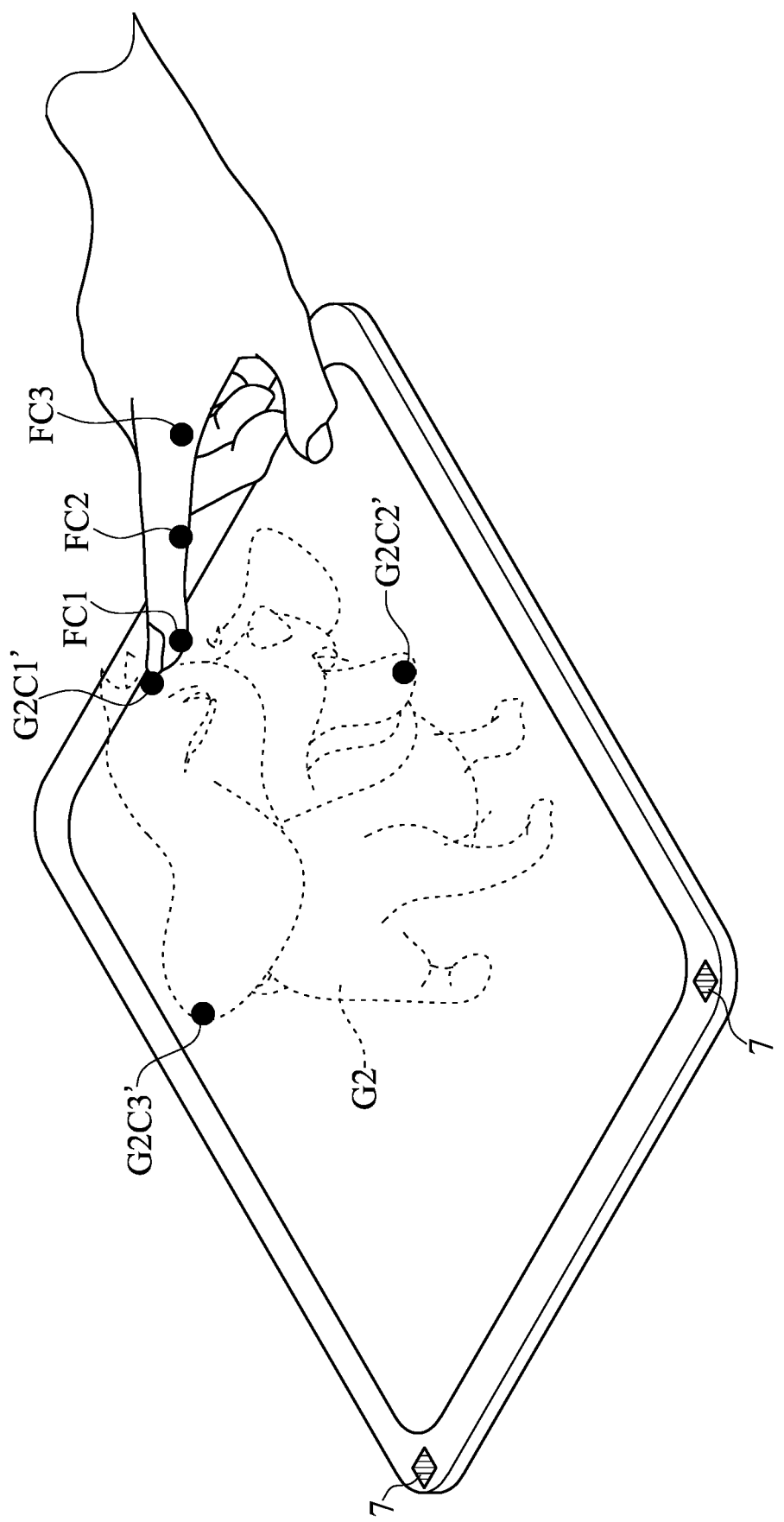
FIG. 7 is another schematic view of the second image information interacting with an object.

Referring to FIG. 5 to FIG. 7, FIG. 5 is a schematic view of the second image display device displaying a second image information, FIG. 6 is a schematic view of the second image information interacting with an object and FIG. 7 is another schematic view of the second image information interacting with an object.

The second image information G2 that is three-dimensional is that of a pet dog. In FIG. 6, a plurality of first three-dimensional coordinate values G2C1 to G2C3 of the second image information G2 can be detected by the sensor 7, or directly obtained by the controller 11 from the data of the second image information G2.

In addition, a plurality of three-dimensional coordinate values FC1 to FC3 of a finger in FIG. 6 can be detected by the sensor 7. Moreover, the plurality of three-dimensional coordinate values FC1 to FC3 of the finger are a plurality of three-dimensional coordinate values in a period of time.

The controller 11 of the electronic device 1 determines second three-dimensional coordinate values G2C1' to G2C3' of the second image information G2 according to the plurality of three-dimensional coordinate values FC1 to FC3 of the finger and the plurality of first three-dimensional coordinate values G2C1 to G2C3 of the second image information G2, and then determines an action or a deformation state of the second image information G2.

Figure 8:
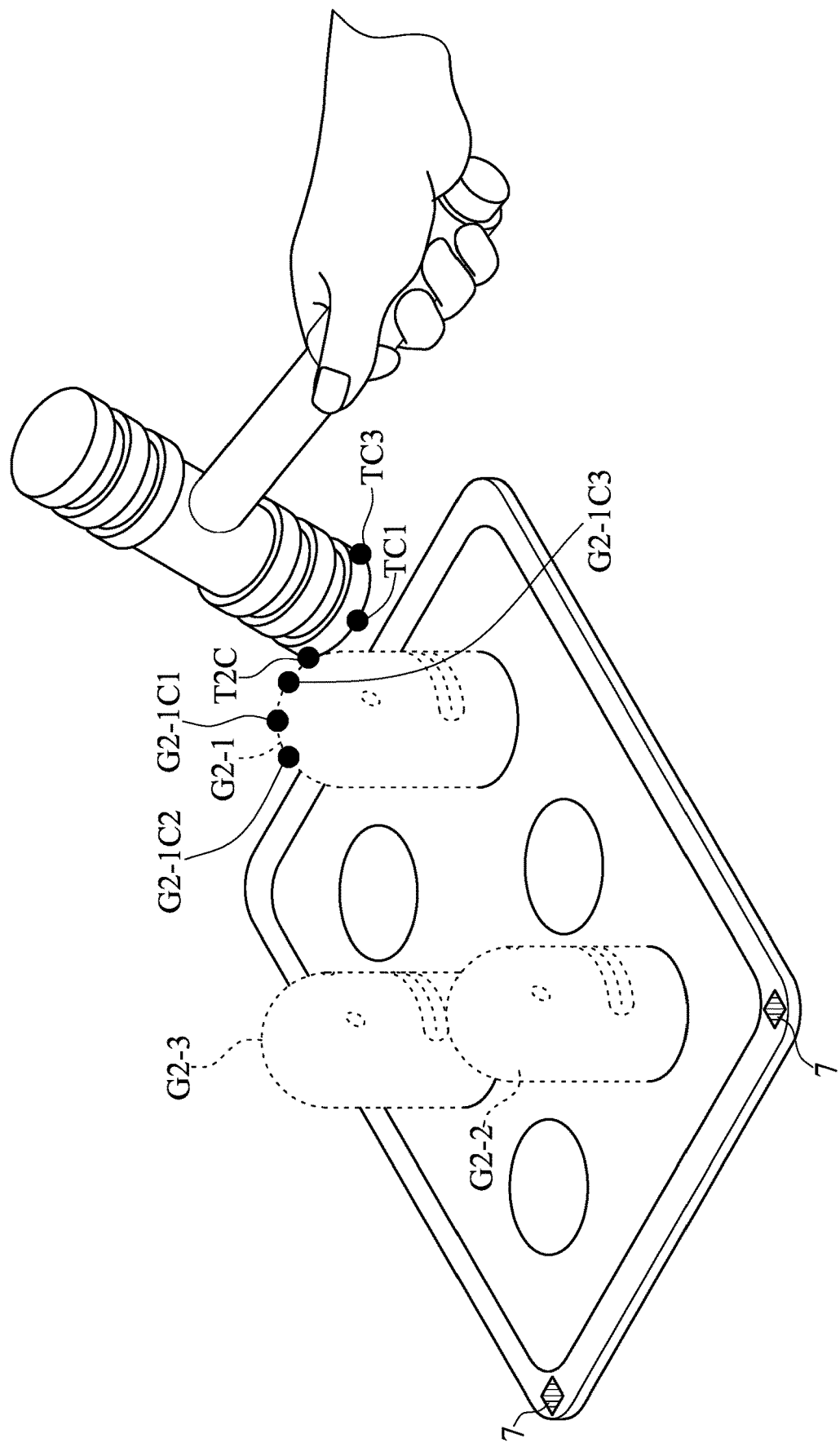
FIG. 8 is still another schematic view of the second image information interacting with an object.
Figure 9:
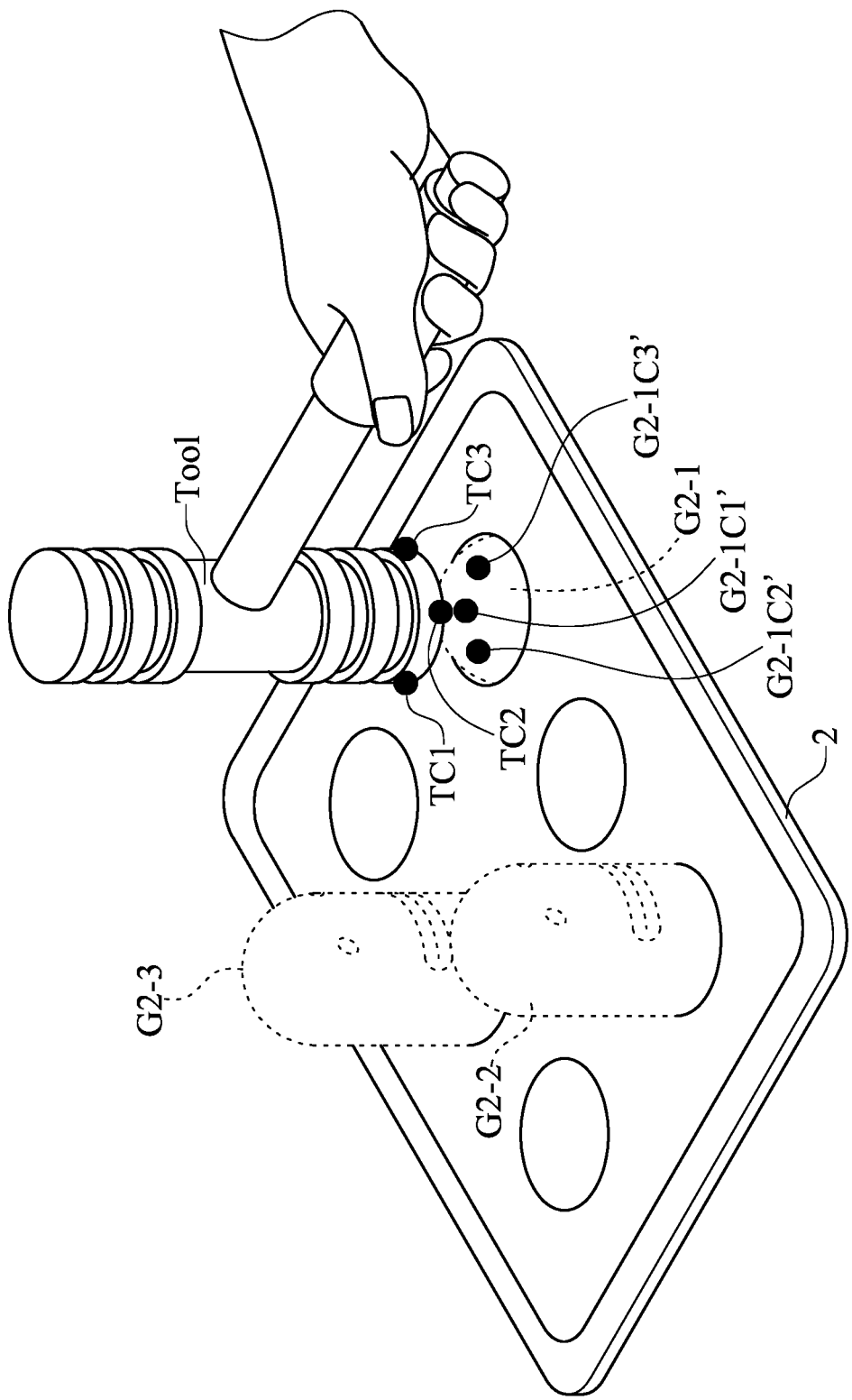
FIG. 9 is yet another schematic view of the second image information interacting with an object.

Referring to FIG. 8 and FIG. 9, FIG. 8 and FIG. 9 are schematic views of the second image information interacting with an object.

Three-dimensional second image information G2-1 to G2-3 is a group of whack-a-mole images that allows the user to use a tool Tool to hit the plurality of three-dimensional second image information G2-1 to G2-3. The controller 11 of the electronic device 1 can determine the action of the second image information G2-1 and the plurality of second three-dimensional image information G2-1C1' to G2-1C3' of the second image information G2-1 by calculating according to a plurality of three-dimensional coordinate values TC1-TC3 of the tool Tool and a plurality of first three-dimensional coordinate values G2-1C1 to G2-1C3 of the three-dimensional second image information G2-1.

Figure 10:
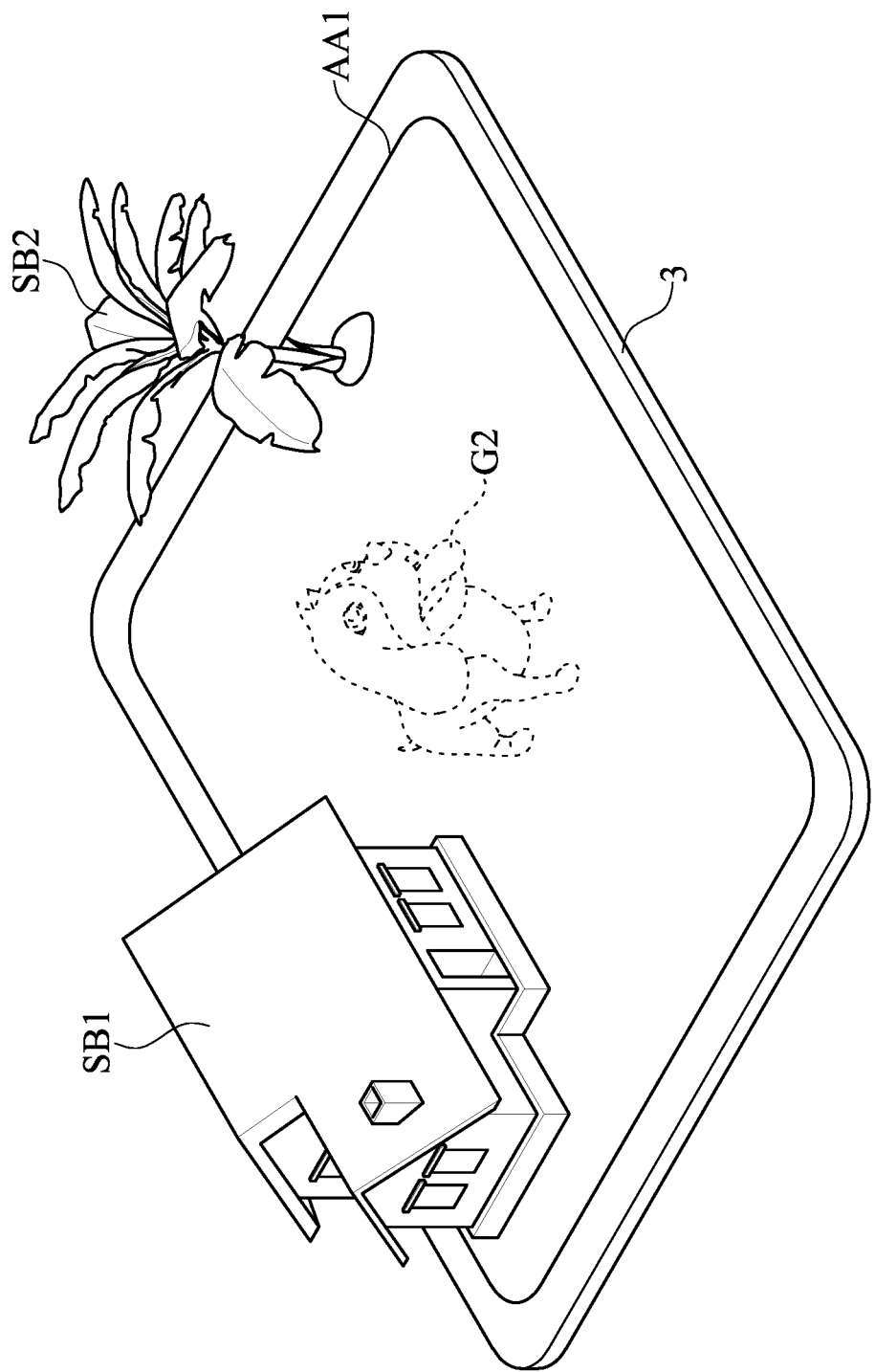
FIG. 10 is a schematic view of the second image information displayed according to a first substance and a second substance.
Figure 11:
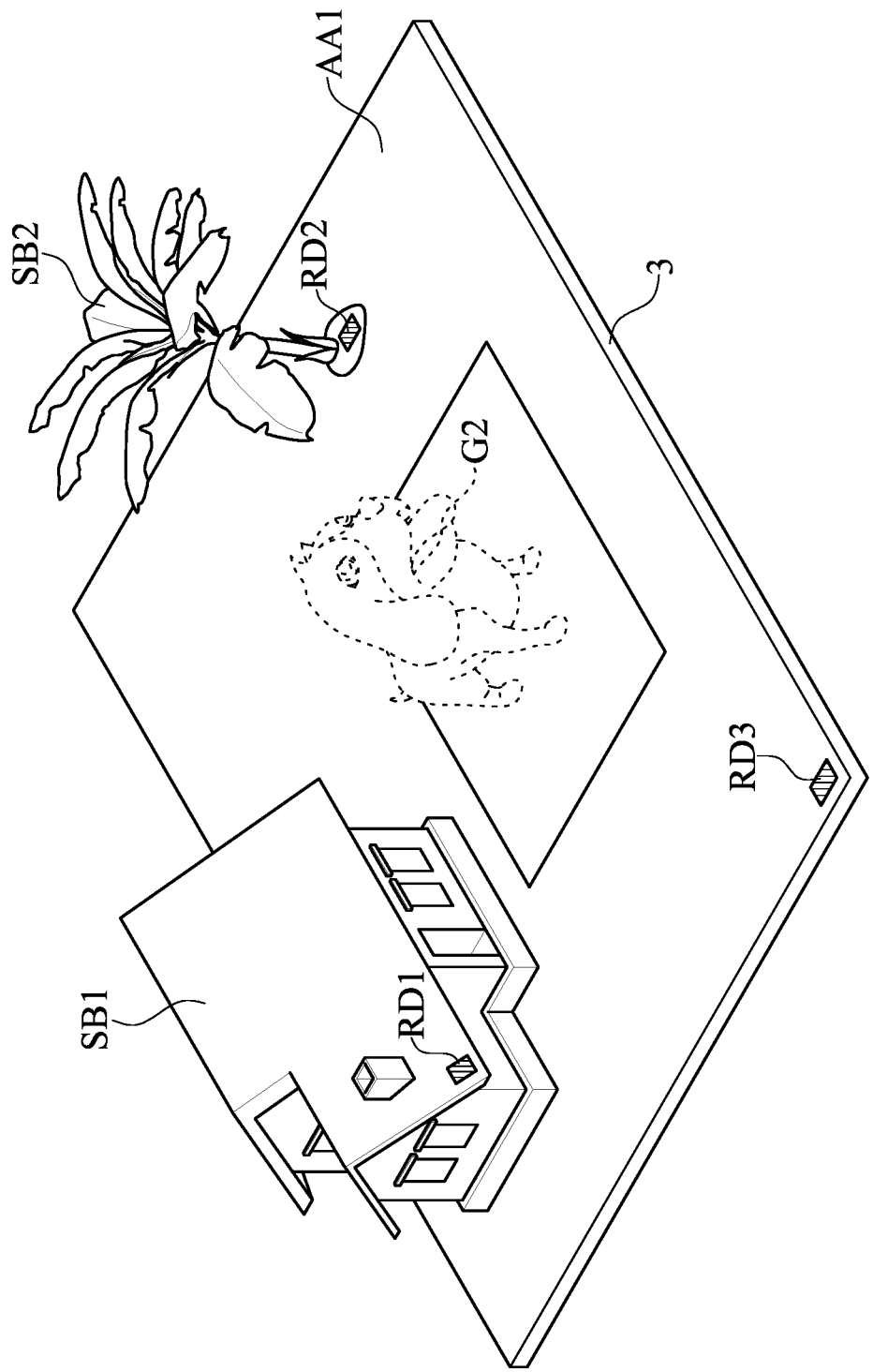
FIG. 11 is a schematic view of the second image information displayed according to the first substance and the second substance.

Referring to FIG. 10 and FIG. 11, FIG. 10 is a schematic view of the second image information displayed according to a first substance and a second substance, and FIG. 11 is a schematic view of the second image information displayed according to the first substance and the second substance.

In FIG. 10 and FIG. 11, when the first substance SB1 and the second substance SB2 are disposed on the second image display device 3, the second image information G2 is displayed on top of the second image display device 3. That is, the second image information G2 is related to the first substance SB1 and the second substance SB2. The sensor 7 can detect the disposition of the first substance SB1 and the second substance SB2 to notify the electronic device 1 or the second image display device 3 to provide the second image information G2. The electronic device 1 or the second image display device 3 can detect corresponding electronic tags RD1 to RD3 of the first substance SB1 and the second substance SB2 through an electronic tag (e.g., RFID), a light sensing, a capacitance sensing, a voltage sensing, a radar sensing, etc. The sensor 7 can also be an electronic tag sensor, a light sensor, a capacitance sensor, a voltage sensor, or a radar sensor.

Moreover, the quantity and form of the first substance SB1 and the second substance SB2 can be adjusted according to actual needs, which are not limited in the present disclosure. In addition, a different second image information G2 can be displayed according to the disposition of the first substance SB1 and the second substance SB2. Furthermore, the electronic device 1 or the second image display device 3 can control the second image information G2 to be active in a first active area AA1 or other active areas. That is, the second image information G2 can interact with the first substance SB1 and the second substance SB2 according to a script.

Second Embodiment

Figure 12:
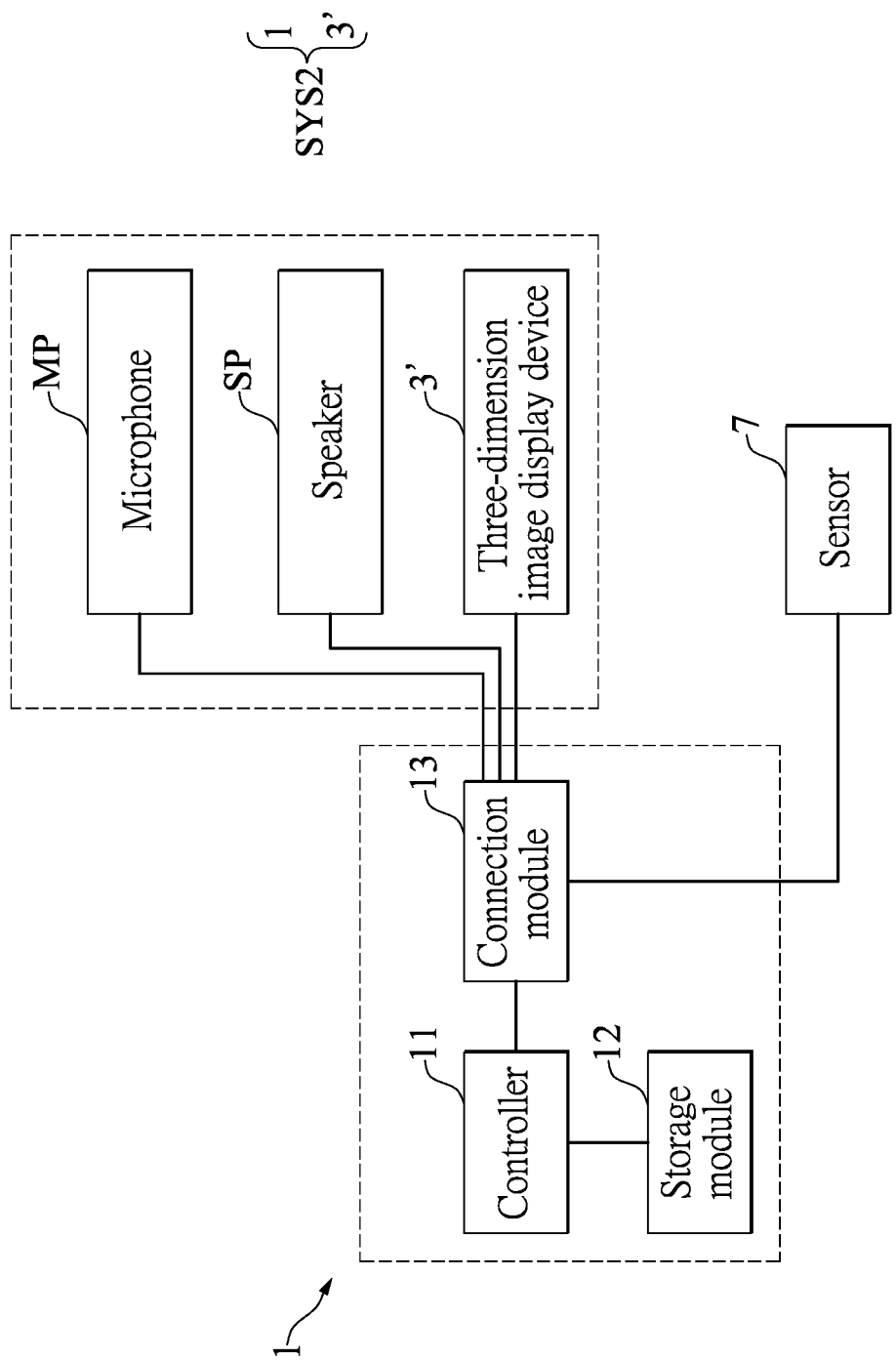
FIG. 12 is a schematic view of an interactive system according to a second embodiment of the present disclosure.

Referring to FIG. 12, FIG. 12 is a schematic view of an interactive system according to a second embodiment of the present disclosure. An interactive system SYS2 can include only an electronic device 1 and a three-dimensional image display device 3'. In the present embodiment, the structures and functions of the electronic device 1 and the three-dimensional image display device 3' are the same as that of the electronic device 1 and the second image display device 3 in the previous embodiment, which are not limited herein.

The electronic device 1 can provide an image information to the three-dimensional image display device 3' for displaying a three-dimensional image information, and the user can use an object to interact with the floating three-dimensional image information displayed. Similarly, the interactive system SYS2 further includes a sensor 7, which can be disposed on the electronic device 1 or the three-dimensional image display device 3'.

Similarly, the interactive system SYS2 can also include a microphone MP and a speaker SP. A connection module 13 of the electronic device 1 is correspondingly connected to the microphone MP, the speaker SP, the three-dimensional image display device 3' and the sensor 7.

Similarly, in the present embodiment, the microphone MP, the speaker SP, the three-dimensional image display device 3' and the sensor 7 can be disposed in the same device.

The microphone MP is used for receiving an audio information. When the microphone MP receives a control audio information, the microphone MP transmits the control audio information to a controller 11 through a connection device CON and the connection module 13 for analysis. The controller 11 further analyzes a control request signal in the control audio information, such as those of rotating, sitting down and jumping. Then, the controller 11 further controls an action of the second image information G2 that is three-dimensional displayed on the second image display device 3 according to the control request signal. In this way, the user can interact with the second image information G2 that is three-dimensional through sound. In addition, the controller 11 can transmit the interactive audio information corresponding to the second image information G2 that is three-dimensional to the speaker SP for playback, thereby enhancing the overall interactive experience of the user.

Figure 13:
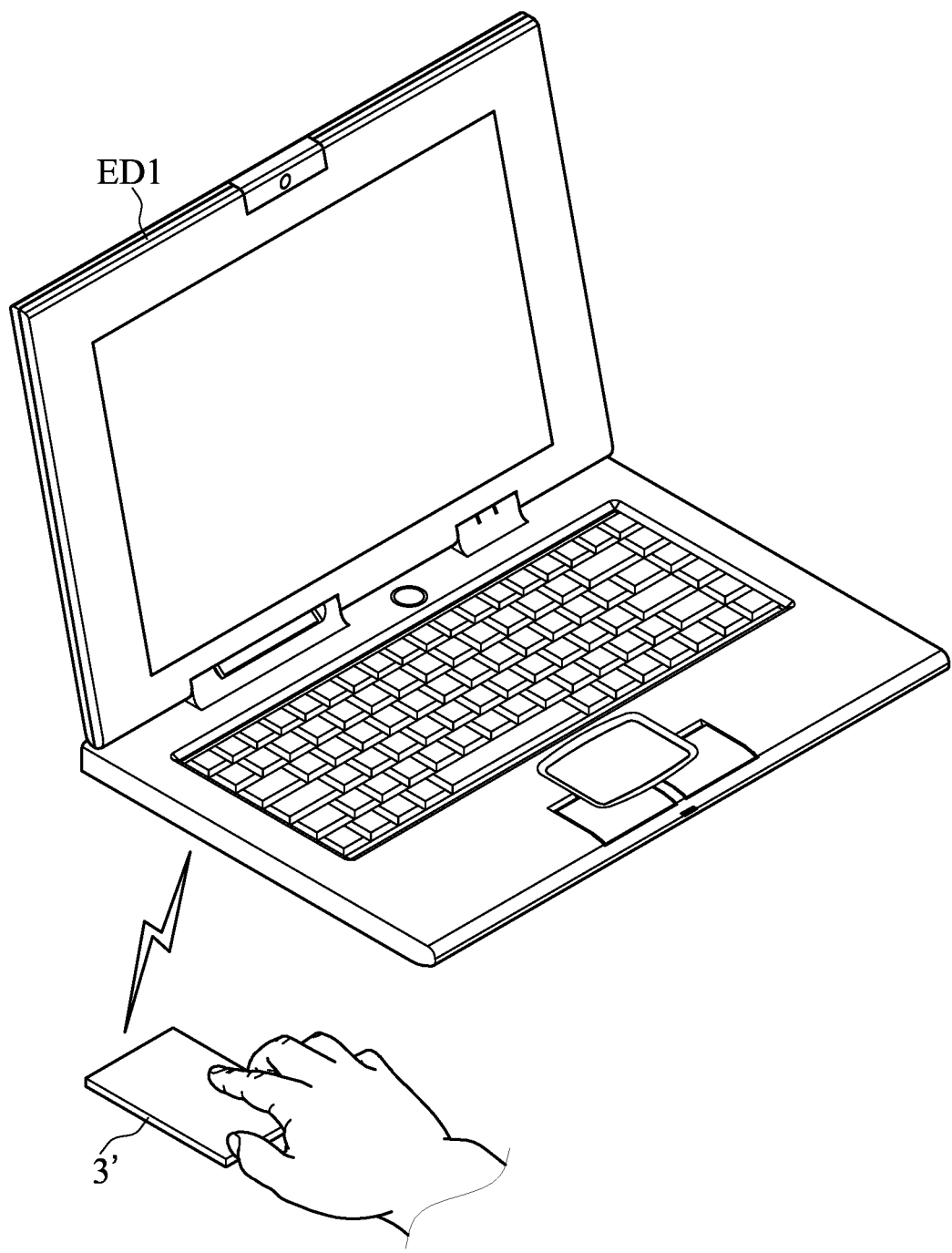
FIG. 13 is another schematic view of the interactive system according to the second embodiment of the present disclosure.
Figure 14:
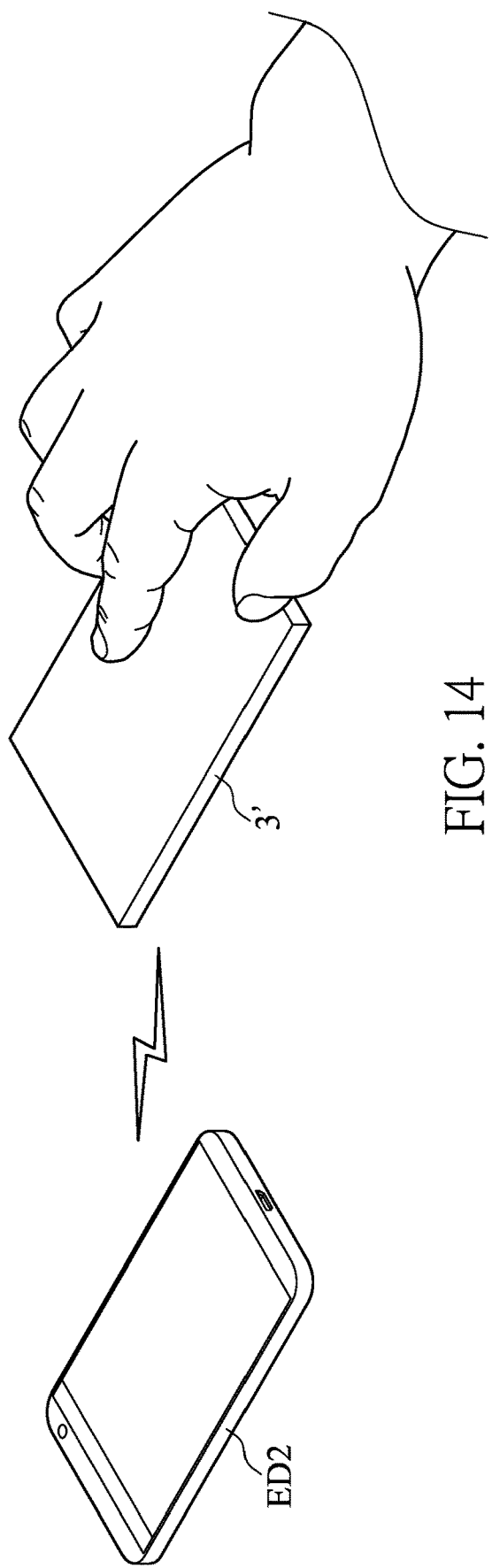
FIG. 14 is still another schematic view of the interactive system according to the second embodiment of the present disclosure.
Figure 15:
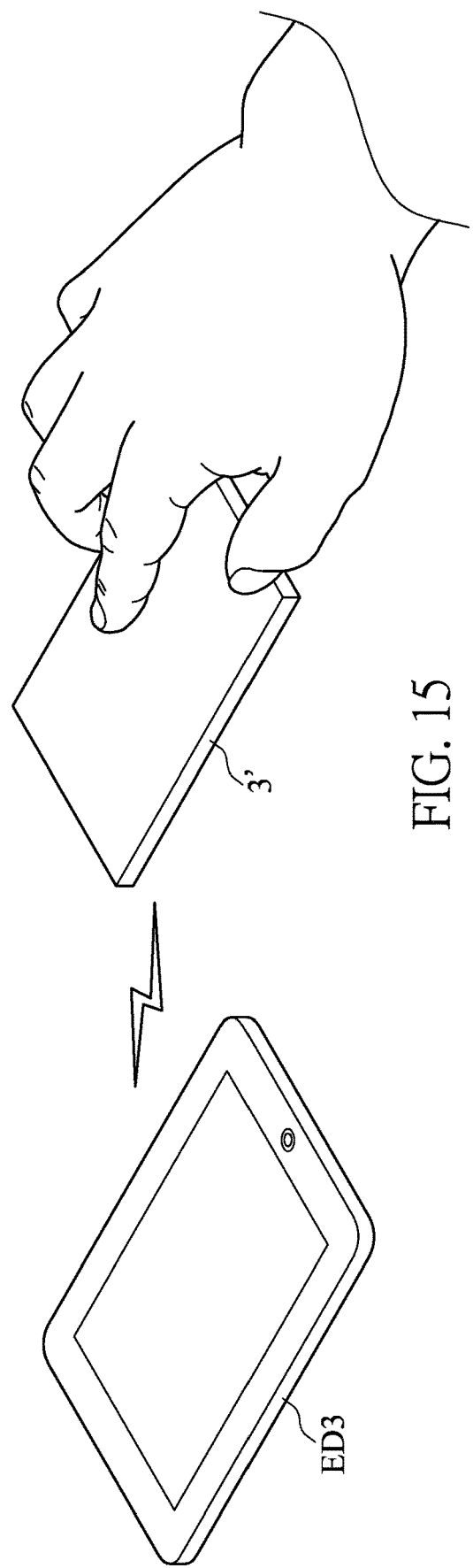
FIG. 15 is yet another schematic view of the interactive system according to the second embodiment of the present disclosure.

Referring to FIG. 13 to FIG. 15, FIG. 13 is another schematic view of the interactive system according to the second embodiment of the present disclosure, FIG. 14 is still another schematic view of the interactive system according to the second embodiment of the present disclosure, and FIG. 15 is yet another schematic view of the interactive system according to the second embodiment of the present disclosure.

A first electronic device ED1 in FIG. 13 is a laptop computer. A second electronic device ED2 in FIG. 14 is a smart phone. A third electronic device ED3 in FIG. 15 is a tablet computer. That is, the first electronic device ED1, the second electronic device ED2 and third electronic device ED3 in FIG. 13 to FIG. 15, respectively, can be connected to the three-dimensional image display device 3' in the present disclosure to display the three-dimensional image information.

In another embodiment, the electronic devices ED1 to ED3 and the three-dimensional image display device 3' can also be disposed in the same housing body, or together as an electronic device, and it is not limited herein.

Third Embodiment

Figure 16:
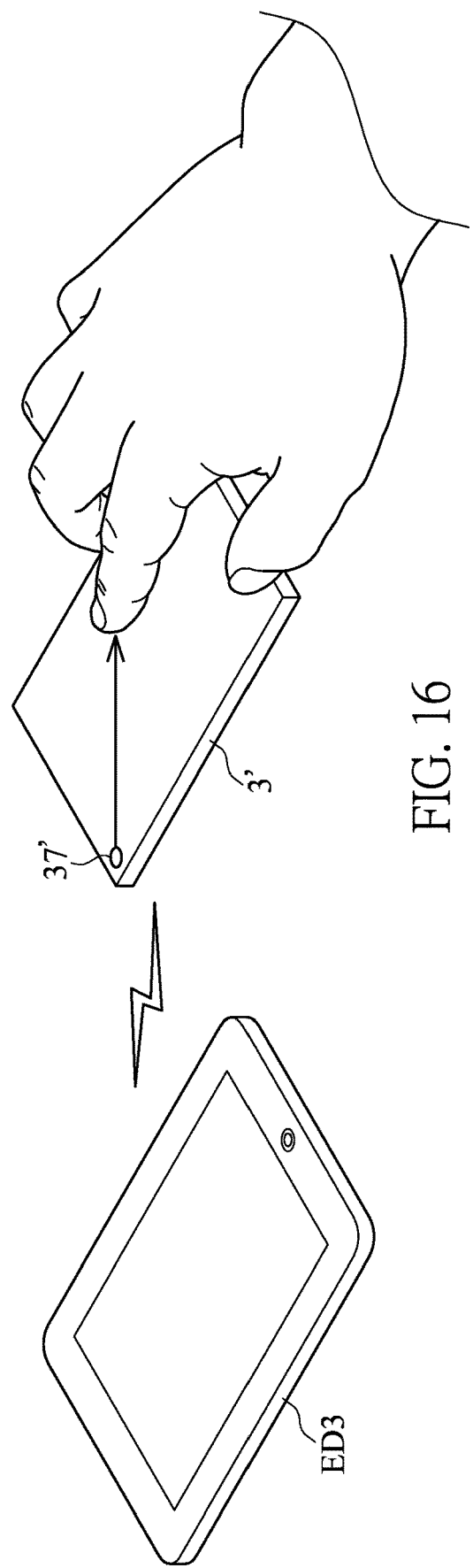
FIG. 16 is a schematic view of an interactive system according to a third embodiment of the present disclosure.
Figure 17:
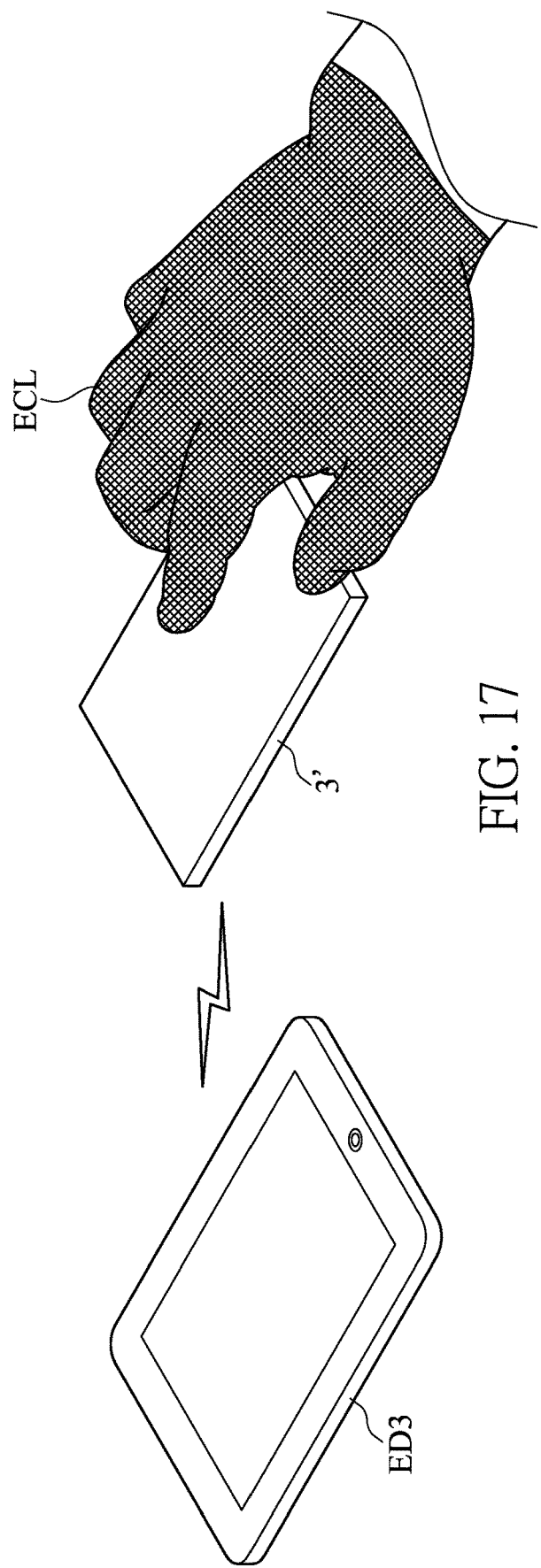
FIG. 17 is another schematic view of the interactive system according to the third embodiment of the present disclosure.

Referring to FIG. 16 and FIG. 17, FIG. 16 is a schematic view of an interactive system according to a third embodiment of the present disclosure, and FIG. 17 is another schematic view of the interactive system according to the third embodiment of the present disclosure.

Referring to FIG. 16, the three-dimensional image display device 3' can further include an electron beam sensor 37'. When the hand of the user interacts with the floating three-dimensional image information, an electron beam can be transmitted to the hand of the user to interact with the hand of the user.

Referring to FIG. 17, the user can wear an electronic interactive glove ECL including a plurality of tactile components (not shown in figures). The electronic interactive glove ECL communicates with the three-dimensional image display device 3' and receives a control signal from the three-dimensional image display device 3', the electronic device ED3 or the server (not shown in figures).

That is, when the user wears the electronic interactive glove ECL and interacts with a floating three-dimensional image information displayed by the three-dimensional image display device 3', according to the status of the user interacting with the floating three-dimensional image information, the electronic device ED3 or the server (not shown in figures) can provide a plurality of control signals to the plurality of tactile feedback components of the electronic interactive glove ECL (not shown in figures) to provide a variety of tactile sensations to the user. In the present embodiment, the tactile feedback component (not shown in figures) is a piezoelectric component.

Beneficial Effects of the Embodiments

In conclusion, the interactive system provided in the present disclosure allows the user to interact intuitively with the three-dimensional image information and generate corresponding movements and changes without the need to wear various types of augmented reality electronic devices.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. An interactive system, comprising:
an electronic device including a controller, a storage module and a connection module;
a first image display device electrically connected to the electronic device, the first image display being a two-dimensional image display device for displaying a two-dimensional image information;
a second image display device connected to the electronic device, the second image display device being a three-dimensional image display device; and
a sensor disposed on the electronic device;
wherein a program is provided in the electronic device, the program at least provides a first image information and a second image information, the controller transmits the first image information to the first image display device for display, the controller transmits the second image information to the second image display device for display, and through the second image display device, a three-dimensional image information of the second image information is displayed in a space on one side of the second image display device;
wherein the second image information displayed in the space on the one side of the second image display device is three-dimensional and at least interacts with an object, the three-dimensional image information of the second image information is displayed by a plurality of lights provided by the second image display device, the object is directly capable of interacting with the light of the three-dimensional image information of the second image information;
wherein the first image display device or the second image display device for detecting at least one object three-dimensional coordinate value of the object, the sensor transmitting the at least one object three-dimensional coordinate value to the controller, and the controller determining a plurality of second three-dimensional coordinate values of the second image information that is three-dimensional according to the at least one object three-dimensional coordinate value and a plurality of first three-dimensional coordinate values of the second image information that is three-dimensional;
wherein the second image display device determines the second three-dimensional coordinate values of the second image information according to the plurality of object three-dimensional coordinate values of the object and the plurality of first three-dimensional coordinate values of the second image information, and then determines an action and a deformation state of the second image information when the object is close to the second image information;
wherein the second image display device includes:
a flat display module;
a lens array layer; and a microstructure layer;

wherein the flat display module has a display surface, the flat display module provides at least one image information and displays the at least one image information through the lens array layer and the microstructure layer, the lens array layer is disposed on the display surface of the flat display module and receives the light of the image information for adjustment, the lens array layer includes a plurality of lenses, the lens array layer is used for modulating the light field, the microstructure layer is disposed on the lens array layer, the microstructure layer includes a plurality of microstructures, the microstructure layer is used for adjusting an angle and a direction of light, and the microstructure layer receives light through the lens array layer and adjusts the light so that the second image display displays the three-dimensional image information floating in the space on one side of the second image display device.

2. The interactive system according to claim 1, wherein the first image display device is disposed on one side of the electronic device, and the second image display device is disposed on the electronic device.

3. The interactive system according to claim 2, wherein the lens of the lens array layer conforms to the oscilloscope formula of $1/f=(n-1)(1/R1+1/R2)$, where R1 and R2 are correspondingly the radii of curvature on two sides of the lens, f is the focal length of the lens and n is the refractive index of the lens.

4. The interactive system according to claim 3, wherein the microstructure layer is a dynamic optical component layer, the microstructure layer has a microstructure function mode and a non-microstructure function mode, and the microstructure layer is used for adjusting the angle and the direction of light when the microstructure layer is switched to the microstructure function mode.

5. The interactive system according to claim 4, wherein the microstructure layer is a liquid crystal lens array layer including a plurality of microstructure liquid crystal lens, and the lens array layer is a liquid crystal lens array layer including a plurality of optically adjusted liquid crystal lens.

6. The interactive system according to claim 5, wherein the lens array layer includes a first structure lens array layer and a second structure lens array layer, the first structure lens array layer having a lens structure that is used for modulating the light field, and the second structure lens array layer not having a lens structure.

7. The interactive system according to claim 1, wherein the second image display device further includes an electron beam sensor, the electronic device or the second image display device enables the electron beam sensor to provide an electron beam to the object according to an interaction status between the second image information that is three-dimensional and the object.

8. The interactive system according to claim 1, wherein the electronic device or the second image display device provides a plurality of control signals to an electronic interactive glove of the object, which allows a plurality of tactile feedback components of the electronic interactive glove to operate.

9. An interactive system, comprising:
an electronic device including a controller, a storage module and a connection module;
a three-dimensional image display device, the connection module of the electronic device being connected to the three-dimensional image display device; and a sensor disposed on the electronic device or the three-dimensional image display device for detecting a plurality of object three-dimensional coordinate value of an object;

wherein a program is provided in the electronic device, the program is stored in the storage module, the program at least provides an image information, the controller transmits the image information to the three-dimensional image display device for display, and through the three-dimensional image display device, a three-dimensional image information is displayed in a space on one side of the three-dimensional image display device;

wherein the three-dimensional image information at least interacts with the object;

wherein the sensor transmits the plurality of object three-dimensional coordinate values to the controller, and the controller determines a plurality of second three-dimensional coordinate values of the three-dimensional image information according to the plurality of the object three-dimensional coordinate values and a plurality of first three-dimensional coordinate values of a three-dimensional image information of a second image information;

wherein the plurality of second three-dimensional coordinate values of the three-dimensional image information determines an action and a deformation state when the three-dimensional image information interacts with the object, wherein the three-dimensional image display device includes a flat display module, a lens array layer, and a microstructure layer;

wherein the flat display module has a display surface, the flat display module provides at least one image information and displays the at least one image information through the lens array layer and the microstructure layer, the lens array layer is disposed on the display surface of the flat display module and receives the light of the image information for adjustment, the lens array layer includes a plurality of lenses, the lens array layer is used for modulating the light field, the microstructure layer is disposed on the lens array layer, the microstructure layer includes a plurality of microstructures, the microstructure layer is used for adjusting an angle and a direction of light, and the microstructure layer receives light through the lens array layer and adjusts the light so that the three-dimensional image display device displays the three-dimensional image information floating in the space on one side of the second image display device;

wherein the three-dimensional image information is displayed by a plurality of lights provided by the three-dimensional image display device.

10. The interactive system according to claim 9, wherein the three-dimensional image display device further includes an electron beam sensor, the electronic device or the three-dimensional image display device enables the electron beam sensor to provide an electron beam to the object according to an interaction status between the three-dimensional image information and the object.

11. The interactive system according to claim 9, wherein the electronic device or the three-dimensional image display device provides a plurality of control signals to an electronic interactive device disposed on the object, which allows a plurality of tactile feedback components of the electronic interactive device to operate.

* * * * *